United States Patent
Na et al.

(10) Patent No.: US 9,436,833 B2
(45) Date of Patent: Sep. 6, 2016

(54) SECURITY CIRCUITS AND SECURITY SYSTEMS INCLUDING THE SAME

(71) Applicant: Samsung Electronics Co., Ltd., Suwon-Si, Gyeonggi-Do (KR)

(72) Inventors: Ji-Myung Na, Suwon-si (KR); Kee-Moon Chun, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/499,724

(22) Filed: Sep. 29, 2014

(65) Prior Publication Data

US 2015/0161416 A1    Jun. 11, 2015

(30) Foreign Application Priority Data

Dec. 5, 2013    (KR) .................. 10-2013-0150366

(51) Int. Cl.
*G06F 21/72*    (2013.01)
*G06F 21/60*    (2013.01)

(52) U.S. Cl.
CPC .................... *G06F 21/60* (2013.01)

(58) Field of Classification Search
CPC ............................ G06F 21/72; G06F 21/60
USPC ......................................... 713/192
See application file for complete search history.

(56) References Cited

U.S. PATENT DOCUMENTS

| 5,574,693 | A | * | 11/1996 | Inui | .......................... | G11C 8/08 |
| | | | | | | 365/201 |
| 7,487,418 | B2 | | 2/2009 | Kayukawa et al. | | |
| 2002/0159594 | A1 | * | 10/2002 | Kori | .......................... | G06F 21/10 |
| | | | | | | 380/203 |
| 2007/0239995 | A1 | * | 10/2007 | Tucker | ............. | G01R 31/31719 |
| | | | | | | 713/189 |
| 2009/0300371 | A1 | * | 12/2009 | Yoshiya | ......... | G01R 31/318533 |
| | | | | | | 713/193 |
| 2012/0069991 | A1 | | 3/2012 | Junod | | |
| 2012/0317450 | A1 | | 12/2012 | Miura et al. | | |
| 2013/0080850 | A1 | | 3/2013 | Swoboda | | |

FOREIGN PATENT DOCUMENTS

| JP | 2003107132 A | 4/2003 |
| JP | 2004272312 A | 9/2004 |
| JP | 2009093496 A | 4/2009 |
| JP | 2011107930 A | 6/2011 |
| JP | 2013036874 A | 2/2013 |
| KR | 100659182 B1 | 12/2006 |

\* cited by examiner

*Primary Examiner* — Kambiz Zand
*Assistant Examiner* — Aubrey Wyszynski
(74) *Attorney, Agent, or Firm* — Harness, Dickey & Pierce, P.L.C.

(57) ABSTRACT

A security circuit may include a functional circuit including a test chain that connects flip-flops to verify hardware of the functional circuit, the functional circuit configured to generate an output signal by encrypting an input signal based on a control signal, a mode signal, and the chain; and/or a test controller configured to generate the input, control, and mode signals, and configured to generate an authentication result based on the output signal. A security circuit may include a first device including a plurality of flip-flops in a test chain, the first device configured to receive first, second, and third signals, and configured to generate a fourth signal by encrypting the first signal based on the second and third signals and the chain; and/or a second device configured to generate the first, second, and third signals, and configured to generate an authentication result based on the fourth signal.

20 Claims, 15 Drawing Sheets

SECURITY CIRCUITS AND SECURITY SYSTEMS INCLUDING THE SAME

CROSS-REFERENCE TO RELATED APPLICATION(S)

This application claims priority from Korean Patent Application No. 10-2013-0150366, filed on Dec. 5, 2013, in the Korean Intellectual Property Office (KIPO), the entire contents of which are incorporated herein by reference.

BACKGROUND

1. Field

Some example embodiments may relate generally to security circuits. Some example embodiments may relate to security circuits performing authentication procedures. Some example embodiments relate to security systems including the security circuits.

2. Description of Related Art

A security system may check whether a security product connected to the security system is a genuine product through an authentication procedure between the security system and the security product. The authentication procedure may be embodied with an authentication algorithm (e.g., RSA (Rivest Shamir Adleman) algorithm) on a processor of a common computer structure. The authentication procedure may be embodied with a security circuit implementing the authentication algorithm in a hardware.

The authentication procedure using the security circuit may not be able to correctly check whether the security product is a genuine product when the security circuit included in the security product is a modified security circuit or a copied security circuit.

SUMMARY

Some example embodiments of the inventive concepts may provide security circuits performing authentication procedures using test chains to verify executing functions of hardware of the security circuits.

Some example embodiments of the inventive concepts may provide security systems including security circuits performing authentication procedures using test chains to verify executing functions of hardware of the security circuits.

In some example embodiments, a security circuit may comprise: a functional circuit including a test chain that connects a plurality of flip-flops to verify an executing function of hardware of the functional circuit, the functional circuit configured to generate a test data output signal by encrypting a test data input signal based on a test control signal, a hardware test mode signal, and the test chain; and/or a hardware test controller configured to generate the test data input signal, the test control signal, and the hardware test mode signal, and configured to generate an authentication result based on the test data output signal.

In some example embodiments, the hardware test controller may comprise: a signal generator configured to generate the test data input signal based on an authentication data signal; a data storage unit configured to store an expected test data output signal corresponding to the test data input signal; and/or a comparator configured to generate the authentication result by comparing the test data output signal and the expected test data output signal.

In some example embodiments, the signal generator may be further configured to generate the test control signal and the hardware test mode signal based on a test start signal, which is generated periodically by the signal generator, or an authentication command signal.

In some example embodiments, the data storage unit may be further configured to store the authentication data signal. The data storage unit may be further configured to provide the authentication data signal to the signal generator.

In some example embodiments, the functional circuit may further comprise: a plurality of combinational logic circuits configured to perform the executing function based on stored values of the flip-flops and combinational logic circuit input signals.

In some example embodiments, the hardware test controller may be further configured to generate the combinational logic circuit input signals based on an authentication data signal.

In some example embodiments, the functional circuit may be further configured to generate the test data output signal by encrypting the test data input signal based on the combinational logic circuit input signals.

In some example embodiments, the hardware test controller may be further configured to disable the security circuit or to operate the security circuit in a protection mode when the authentication result represents a failure of authentication.

In some example embodiments, the hardware test controller may be further configured to enable the hardware test mode signal during a reset time or a run time of the functional circuit.

In some example embodiments, a security system may comprise: a first controller configured to generate an authentication command signal and an authentication data signal; and/or a security product including a security circuit which includes a functional circuit including a test chain that connects a plurality of flip-flops to verify an executing function of hardware of the functional circuit, the functional circuit configured to generate a test data output signal by encrypting a test data input signal based on a test control signal, a hardware test mode signal, and the test chain; and a hardware test controller configured to generate the test control signal and the hardware test mode signal based on the authentication command signal, and configured to generate the test data input signal based on the authentication data signal.

In some example embodiments, the first controller may comprise: a data storage unit configured to store an expected test data output signal corresponding to the test data input signal; and/or a comparator configured to generate an authentication result by comparing the test data output signal and the expected test data output signal.

In some example embodiments, the first controller may be further configured to disable the security product when the authentication result represents a failure of authentication.

In some example embodiments, the first controller may be further configured to disable the security circuit or to operate the security circuit in a protection mode when the authentication result represents a failure of authentication.

In some example embodiments, the hardware test controller may comprise: a signal generator configured to generate the test control signal and the hardware test mode signal based on the authentication command signal, and configured to generate the test data input signal based on the authentication data signal; a data storage unit configured to store an expected test data output signal corresponding to the test data input signal; and/or a comparator configured to generate an authentication result by comparing the test data output signal and the expected test data output signal.

In some example embodiments, the first controller may be further configured to disable the security product when the authentication result provided from the hardware test controller represents a failure of authentication.

In some example embodiments, the first controller may be further configured to disable the security circuit or to operate the security circuit in a protection mode when the authentication result represents a failure of authentication.

In some example embodiments, a security circuit may comprise: a first device comprising a plurality of flip-flops in a test chain, the first device configured to receive first, second, and third signals, and configured to generate a fourth signal by encrypting the first signal based on the second signal, the third signal, and the test chain; and/or a second device configured to generate the first, second, and third signals, and configured to generate an authentication result based on the fourth signal.

In some example embodiments, the second device may be further configured to disable the security circuit when the authentication result represents a failure of authentication.

In some example embodiments, the second device may be further configured to operate the security circuit in a protection mode when the authentication result represents a failure of authentication.

In some example embodiments, the second device may be further configured to disable the security circuit or to operate the security circuit in a protection mode when the authentication result represents a failure of authentication.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
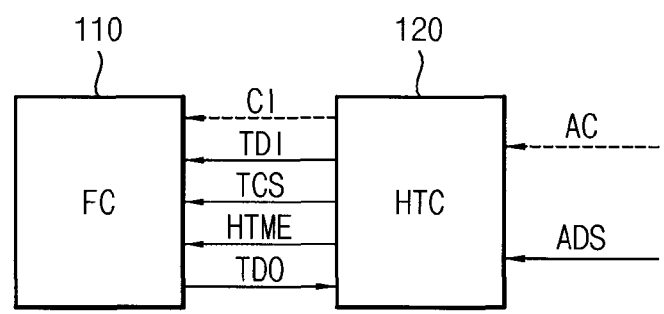
FIG. 1 is a block diagram illustrating a security circuit according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating a security circuit according to some example embodiments.

Referring to FIG. 1, a security circuit 100 includes a functional circuit (FC) 110 and a hardware test controller (HTC) 120. The functional circuit 110 includes a test chain connecting a plurality of flip-flops to verify an executing function of a hardware of the functional circuit 110. The functional circuit 110 generates a test data output signal TDO by encrypting a test data input signal TDI based on a test control signal TCS, a hardware test mode signal HTME, and the test chain. The hardware test controller 120 generates the test data input signal TDI, the test control signal TCS, and the hardware test mode signal HTME. The hardware test controller 120 may generate a combinational logic circuit input signals CI based on the authentication data signal ADS. The combinational logic circuit input signals CI may be provided to the functional circuit 110.

A structure of the test chain connecting the flip-flops included in the functional circuit 110 will be described with the reference to FIG. 4. The hardware test controller 120 will be described with the reference to FIGS. 2A and 2B.

Figure 2A:
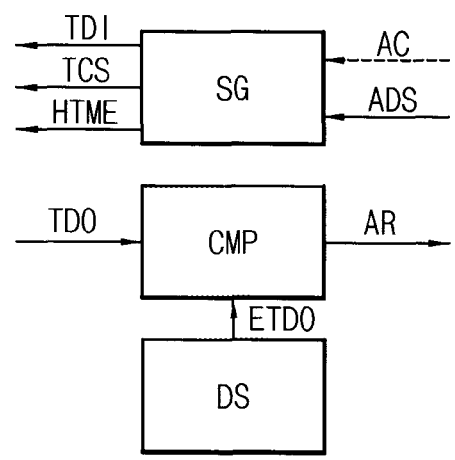
FIGS. 2A and 2B are block diagrams illustrating some example embodiments of the hardware test controller included in the security circuit of FIG. 1.
Figure 2B:
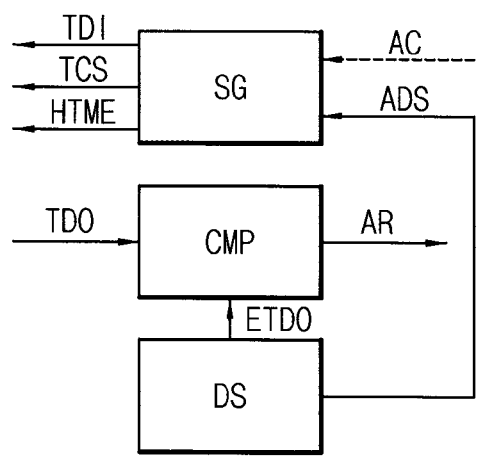

FIGS. 2A and 2B are block diagrams illustrating some example embodiments of the hardware test controller included in the security circuit of FIG. 1. The hardware test controller 120 included in the security circuit 100 of FIG. 1 may be embodied with various methods. Hardware test controllers 120a, 120b of FIGS. 2A and 2B are some example embodiments of the hardware test controller 120 of FIG. 1. The hardware test controller 120 of FIG. 1 is not restricted to the hardware test controllers 120a, 120b of FIGS. 2A and 2B.

Referring to FIG. 2A, the hardware test controller 120a may include a signal generator SG, a data storage unit DS, and a comparator CMP. The signal generator SG may generate the test data input signal TDI based on an authentication data signal ADS. The data storage unit DS may store an expected test data output signal ETDO corresponding to the test data input signal TDI. The comparator CMP may generate an authentication result AR by comparing the test data output signal TDO and the expected test data output signal ETDO. The signal generator SG may generate the test control signal TCS and the hardware test mode signal HTME based on a test start signal generated periodically in the signal generator SG or an authentication command signal AC.

In some example embodiments, the signal generator SG may output the authentication data signal ADS as the test data input signal TDI. In some example embodiments, when the authentication data signal ADS is an authentication number, the signal generator SG may generates the test data input signal TDI based on the authentication number.

The authentication command signal AC may be a genuineness check command signal or may be a circuit modification check command signal. The genuineness check command signal orders the security circuit 100 to check whether a security product including the security circuit 100 is a genuine product or not. The circuit modification check command signal orders the security circuit 100 to check whether the security circuit 100 is attacked physically or not. An authentication procedure of the security circuit 100 and a security system including the security circuit 100 in response to the genuineness check command signal and the circuit modification check command signal will be described with the references to FIGS. 14 and 15.

The hardware test controller 120a may disable the security circuit 100 or operate the security circuit 100 in a protection mode when the authentication result AR represents a failure of authentication.

The expected test data output signal ETDO is a correct test data output signal TDO generated by the functional circuit 110 in response to the test data input signal TDI corresponding to the authentication data signal during test time of the functional circuit 110.

The comparator CMP outputs a signal representing a success of authentication when the test data output signal TDO is same as the expected test data output signal ETDO. When the authentication result AR is a digital signal, a value of the signal representing the success of authentication may be an enabled level or a disabled level. The comparator CMP outputs a signal representing a failure of authentication when the test data output signal TDO is different from the expected test data output signal ETDO. A value of the signal representing the failure of authentication may be the disabled level or a complement of the enabled level. The enabled level may be logical value 0 or logical value 1. The disabled level may be the complement of the enabled level (e.g., logical value 1 or logical value 0).

Referring to FIG. 2B, the data storage unit DS may store the authentication data signal ADS, and may provide the authentication data signal ADS to the signal generator SG. The signal generator SG and the comparator CMP included in the hardware test controller 120b of FIG. 2B are the same as the signal generator SG and the comparator CMP included in the hardware test controller 120a of FIG. 2A.

In some example embodiments, the authentication data signal ADS may be provided from the outside of the security circuit 100, like the case of the hardware test controller 120a of FIG. 2A. In some example embodiments, the authentication data signal ADS may be already stored in the data storage unit DS before the hardware test period, and the authentication data signal ADS may be provided from the data storage unit DS, like the hardware test controller 120b of FIG. 2B.

Figure 3:
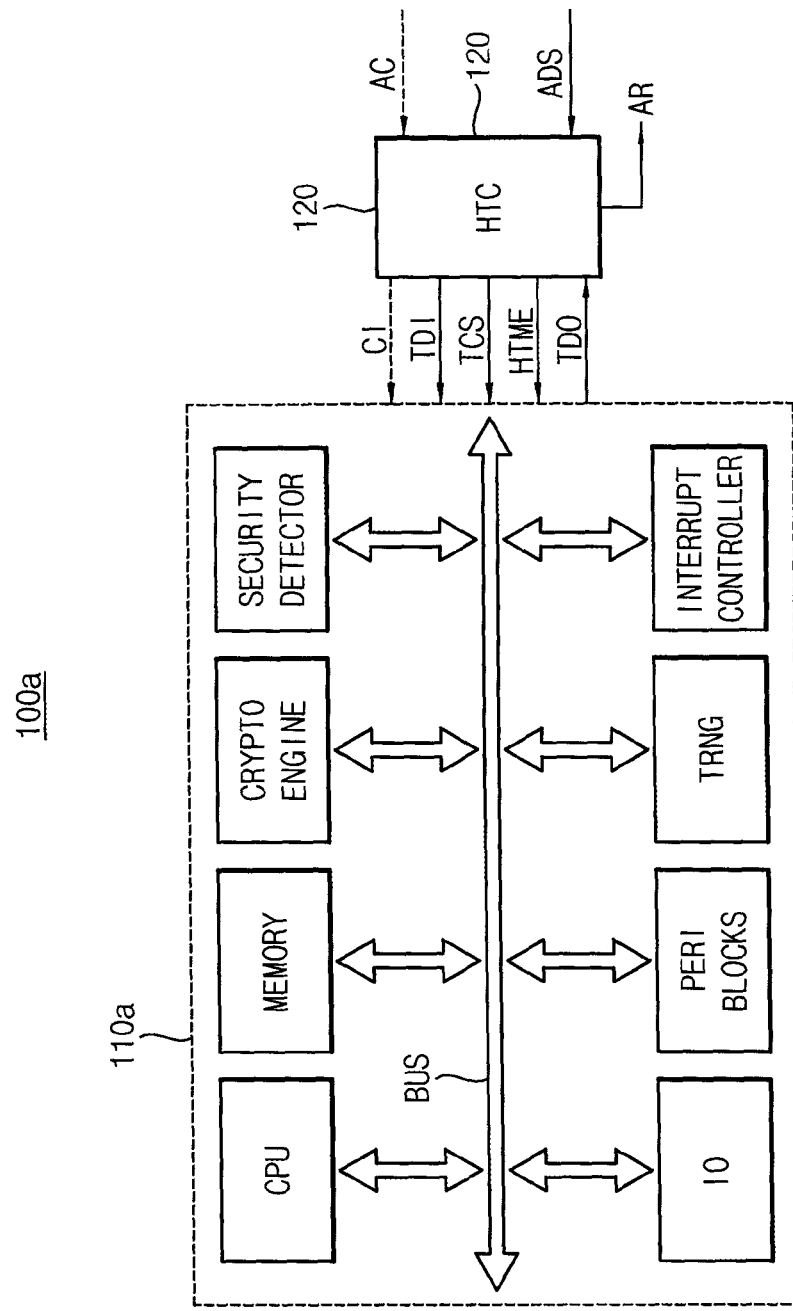
FIG. 3 is a block diagram illustrating a security circuit according to some example embodiments.

FIG. 3 is a block diagram illustrating a security circuit according to some example embodiments.

Referring to FIG. 3, a security circuit 100a includes a functional circuit 110a and a hardware test controller 120. The functional circuit 110a includes a test chain connecting a plurality of flip-flops to verify an executing function of a hardware of the functional circuit 110a. The functional circuit 110a generates a test data output signal TDO by encrypting a test data input signal TDI based on a test control signal TCS, a hardware test mode signal HTME, and the test chain. The hardware test controller 120 generates the test data input signal TDI, the test control signal TCS, and the hardware test mode signal HTME, and generates an authentication result AR based on the test data output signal TDO.

The functional circuit 110a may include any integrated circuit configured to perform own executing functions. The functional circuit 110a may have a typical computer architecture. The functional circuit 110a may include a security detector SECURITY DETECTOR, an encryption/decryption engine CRYPTO ENGINE, a processor CPU, a memory MEMORY, an input/output unit IO, a peripheral blocks PERI BLOCKS, a random number generator TRNG, an interrupt controller INTERRUPT CONTROLLER, and bus architecture BUS.

The security detector SECURITY DETECTOR may detect changes of operating environment of the security circuit 100 (e.g., change of electrical current or voltage level at a node of the security circuit 100) when the security circuit 100 is attacked by a focused ion beam (FIB) method, a laser fault injection (LFI), or a wire insertion.

In some example embodiments, the functional circuit 110a may execute the authentication procedure by the encryption/decryption engine CRYPTO ENGINE implements an authentication algorithm in a hardware. In some example embodiments, the functional circuit 110a may execute the authentication procedure by executing the authentication algorithm on the processor CPU. The security circuit 100a according to some example embodiments may encrypt the test data input signal TDI by using a test chain which already exists in the functional circuit 110a without additional hardware.

Figure 4:
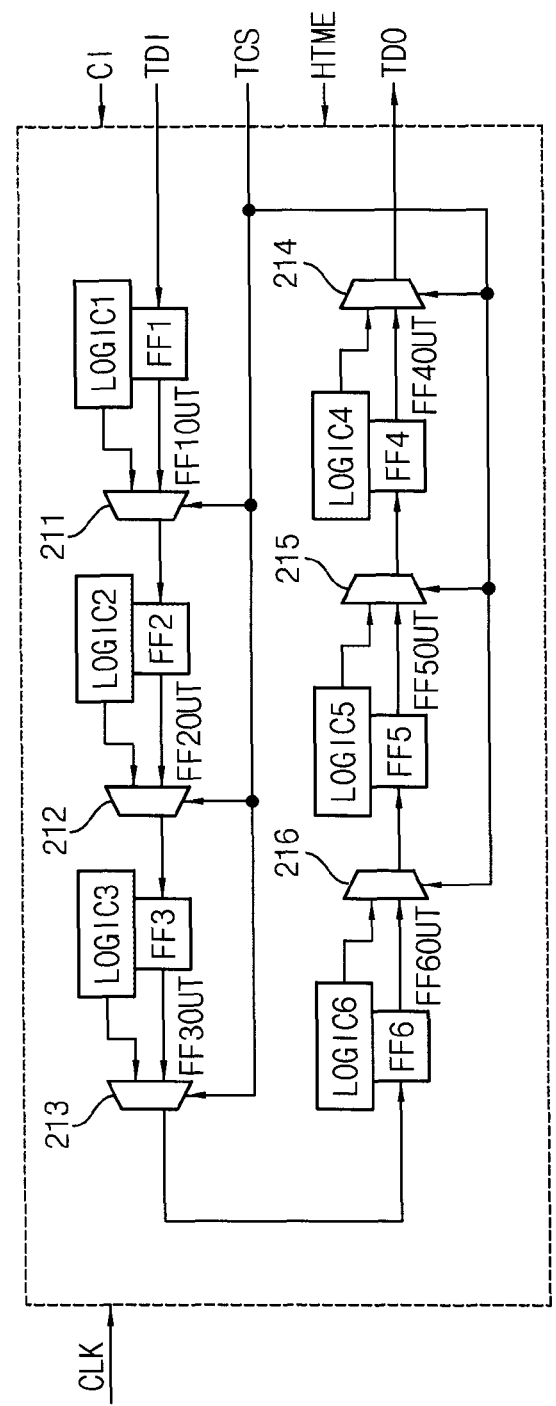
FIG. 4 is a block diagram illustrating a functional circuit included in the security circuit of FIG. 1.

FIG. 4 is a block diagram illustrating a functional circuit included in the security circuit of FIG. 1.

Referring to FIG. 4, a functional circuit 200 is an example embodiment of the functional circuit 110 included in the security circuit 100 of FIG. 1. The functional circuit 200 may include a plurality of flip-flops FF1, FF2, FF3, FF4, FF5, and FF6, a plurality of combinational logic circuits LOGIC1, LOGIC2, LOGIC3, LOGIC4, LOGIC5, and LOGIC6, and a plurality of multiplexers 211 through 216.

The functional circuit 200 may include a test chain connecting the flip-flops FF1, FF2, FF3, FF4, FF5, and FF6 and the multiplexers 211 through 216. The test chain may receive the test data input signal TDI and generate the test data output signal TDO based on the test control signal TCS. The combinational logic circuit input signals CI may be provided to the combinational logic circuits LOGIC1, LOGIC2, LOGIC3, LOGIC4, LOGIC5, and LOGIC6. The combinational logic circuits LOGIC1, LOGIC2, LOGIC3, LOGIC4, LOGIC5, and LOGIC6 may perform executing functions of the functional circuit 200 based on stored values FF1OUT, FF2OUT, FF3OUT, FF4OUT, FF5OUT, and FF6OUT of the flip-flops FF1, FF2, FF3, FF4, FF5, and FF6.

The functional circuit 200 may operate in a hardware test mode or a normal mode based on the hardware test mode signal HTME. When the hardware test mode signal HTME has the enabled level, the functional circuit 200 operates in the hardware test mode to verify the function of the flip-flops FF1, FF2, FF3, FF4, FF5, and FF6 and the combinational logic circuits LOGIC1, LOGIC2, LOGIC3, LOGIC4, LOGIC5, and LOGIC6 by using the test chain. When the hardware test mode signal HTME has the disabled level, the functional circuit 200 operates in the normal mode to perform the own executing functions of the functional circuit 200 by using the flip-flops FF1, FF2, FF3, FF4, FF5, and FF6 and the combinational logic circuits LOGIC1, LOGIC2, LOGIC3, LOGIC4, LOGIC5, and LOGIC6. The functional circuit 200 operating in the normal mode does not use the test chain.

When the hardware test mode signal HTME has the enabled level and the test control signal TCS has the enabled level, the first multiplexer 211 outputs the stored value FF1OUT of the first flip-flop FF1, and the output signal of the first multiplexer 211 is stored to the second flip-flop FF2 at the next rising edge of a clock signal CLK. The second multiplexer 212 outputs the stored value FF2OUT of the second flip-flop FF2, and the output signal of the second multiplexer 212 is stored to the third flip-flop FF3 at the next rising edge of the clock signal CLK. The third multiplexer 213 outputs the stored value FF3OUT of the third flip-flop FF3, and the output signal of the third multiplexer 213 is stored to the sixth flip-flop FF6 at the next rising edge of the clock signal CLK. The sixth multiplexer 216 outputs the stored value FF6OUT of the sixth flip-flop FF6, and the output signal of the sixth multiplexer 216 is stored to the fifth flip-flop FF5 at the next rising edge of the clock signal CLK. The fifth multiplexer 215 outputs the stored value FF5OUT of the fifth flip-flop FF5, and the output signal of the fifth multiplexer 215 is stored to the fourth flip-flop FF4 at the next rising edge of the clock signal CLK. The fourth multiplexer 214 outputs the stored value FF4OUT of the fourth flip-flop FF4 as the test data output signal TDO.

When the hardware test mode signal HTME has the enabled level and the test control signal TCS has the disabled level, the first multiplexer 211 outputs an output signal of the first combinational logic circuit LOGIC1, and the output signal of the first multiplexer 211 is stored to the second flip-flop FF2 at the next rising edge of the clock signal CLK. The second multiplexer 212 outputs an output signal of the second combinational logic circuit LOGIC2, and the output signal of the second multiplexer 212 is stored to the third flip-flop FF3 at the next rising edge of the clock signal CLK. The third multiplexer 213 outputs an output signal of the third combinational logic circuit LOGIC3, and the output signal of the third multiplexer 213 is stored to the sixth flip-flop FF6 at the next rising edge of the clock signal CLK. The sixth multiplexer 216 outputs an output signal of the sixth combinational logic circuit LOGIC6, and the output signal of the sixth multiplexer 216 is stored to the fifth flip-flop FF5 at the next rising edge of the clock signal CLK. The fifth multiplexer 215 outputs an output signal of the fifth combinational logic circuit LOGIC5, and the output signal of the fifth multiplexer 215 is stored to the fourth flip-flop FF4 at the next rising edge of the clock signal CLK. The fourth multiplexer 214 outputs an output signal of the fourth combinational logic circuit LOGIC4 as the test data output signal TDO.

The functional circuit 200 may generate the test data output signal TDO by encrypting the test data input signal TDI based on the combinational logic circuit input signals CI.

Signals provided to the combinational logic circuits LOGIC1, LOGIC2, LOGIC3, LOGIC4, LOGIC5, and LOGIC6 may be classified as first signals and second signals. The first signals are provided from the flip-flops FF1, FF2, FF3, FF4, FF5, and FF6. The second signals are provided from the outside of the functional circuit 200 to the combinational logic circuits LOGIC1, LOGIC2, LOGIC3, LOGIC4, LOGIC5, and LOGIC6 directly. The combinational logic circuit input signals CI are a sort of the second signal.

Figure 5:
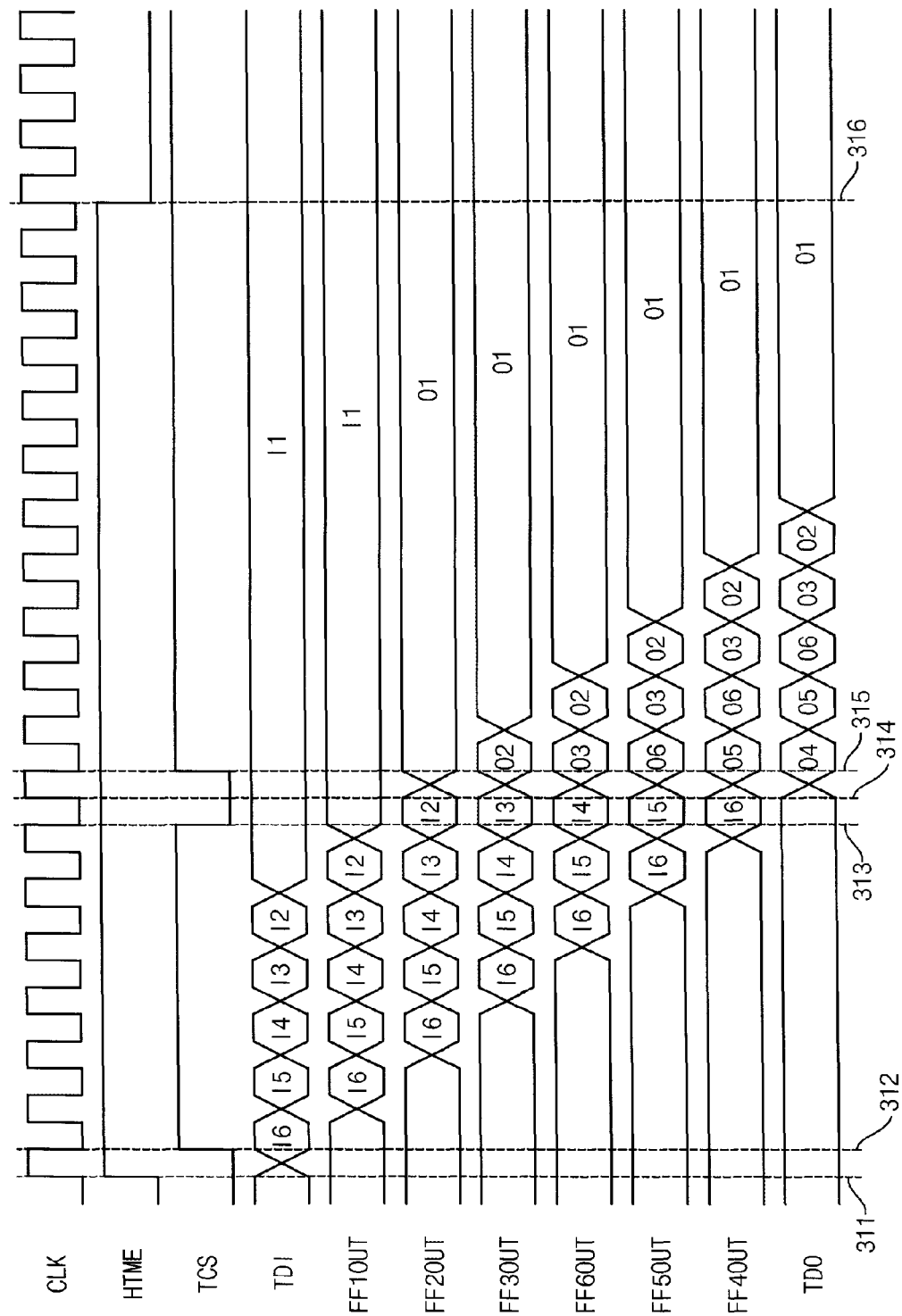
FIG. 5 is a timing diagram illustrating signals of the functional circuit of FIG. 4.

FIG. 5 is a timing diagram illustrating signals of the functional circuit of FIG. 4. FIGS. 5, 7, 9, and 11 describes the operation of the functional circuit when the enabled level is logical value 1. When the hardware test mode signal HTME has logical value 1, the functional circuits of FIGS. 4, 6, 8, and 10 operate in the hardware test mode. When the hardware test mode signal HTME has logical value 0, the functional circuits of FIGS. 4, 6, 8, and 10 operate in the normal mode. The operation of the functional circuit when the enabled level is logical value 0 may be understood based on the operation of the functional circuit when the enabled level is logical value 1.

Referring to FIG. 5, the functional circuit 200 operates in the hardware test mode and the hardware test mode signal HTME has the enabled level from a first time point 311 to a sixth time point 316.

The test control signal TCS remains at the enabled level from a second time point 312 to a third time point 313. From the second time point 312 to the third time point 313, the test chain of FIG. 4 operates as a shifter which shifts stored value at every rising edge of the clock signal CLK. A sixth input data I6, a fifth input data I5, a fourth input data I4, a third input data I3, a second input data I2, and a first input data I1 are sequentially inputted through the first flip-flop FF1 as the test data input signal TDI to the test chain. Each of the input data I1, I2, I3, I4, I5, and I6 is transferred to a next flip-flop of the test chain at every rising edge of the clock signal CLK.

At the third time point 313, the first flip-flop FF1 stores the first input data I1, the second flip-flop FF2 stores the second input data I2, the third flip-flop FF3 stores the third input data I3, the sixth flip-flop FF6 stores the fourth input data I4, the fifth flip-flop FF5 stores the fifth input data I5, and the fourth flip-flop FF4 stores the sixth input data I6.

The test control signal TCS remains at the disabled level from the third time point 313 to a fifth time point 315. From the third time point 313 to the fifth time point 315, each of the flip-flops FF1, FF2, FF3, FF4, FF5, and FF6 stores output of each of the previous step combinational logic circuits LOGIC1, LOGIC2, LOGIC3, LOGIC4, LOGIC5, and LOGIC6 at every rising edge of the clock signal CLK.

At a fourth time point 314, the first combinational logic circuit LOGIC1 generates a first output data O1 based on the first input data I1 stored in the first flip-flop FF1. The second flip-flop FF2 stores the first output data O1 from the fourth time point 314 to a fifth time point 315. At the fourth time point 314, the second combinational logic circuit LOGIC2 generates a second output data O2 based on the second input data I2 stored in the second flip-flop FF2. The third flip-flop FF3 stores the second output data O2 from the fourth time point 314 to the fifth time point 315. At the fourth time point 314, the third combinational logic circuit LOGIC3 generates a third output data O3 based on the third input data I3 stored in the third flip-flop FF3. The sixth flip-flop FF6 stores the third output data O3 from the fourth time point 314 to the fifth time point 315. At a fourth time point 314, the sixth combinational logic circuit LOGIC6 generates a sixth output data O6 based on the fourth input data I4 stored in the sixth flip-flop FF6. The fifth flip-flop FF5 stores the sixth output data O6 from the fourth time point 314 to the fifth time point 315. At a fourth time point 314, the fifth combinational logic circuit LOGIC5 generates a fifth output data O5 based on the fifth input data I5 stored in the fifth flip-flop FF5. The fourth flip-flop FF4 stores the fifth output data O5 from the fourth time point 314 to the fifth time point 315. At a fourth time point 314, the fourth combinational logic circuit LOGIC4 generates a fourth output data O4 based on the sixth input data I6 stored in the fourth flip-flop FF4. The fourth output data O4 is outputted as the test data output signal TDO.

The test control signal TCS remains at the enabled level from the fifth time point 315 to a sixth time point 316. From the fifth time point 315 to a sixth time point 316, the test chain of FIG. 4 operates as a shifter which shifts stored value at every rising edge of the clock signal CLK.

From the fifth time point 315 to the sixth time point 316 the fourth output data O4, the fifth output data O5, the sixth output data O6, the third output data O3, the second output data O2, and the first output data O1 are sequentially outputted as the test data output signal TDO.

Figure 6:
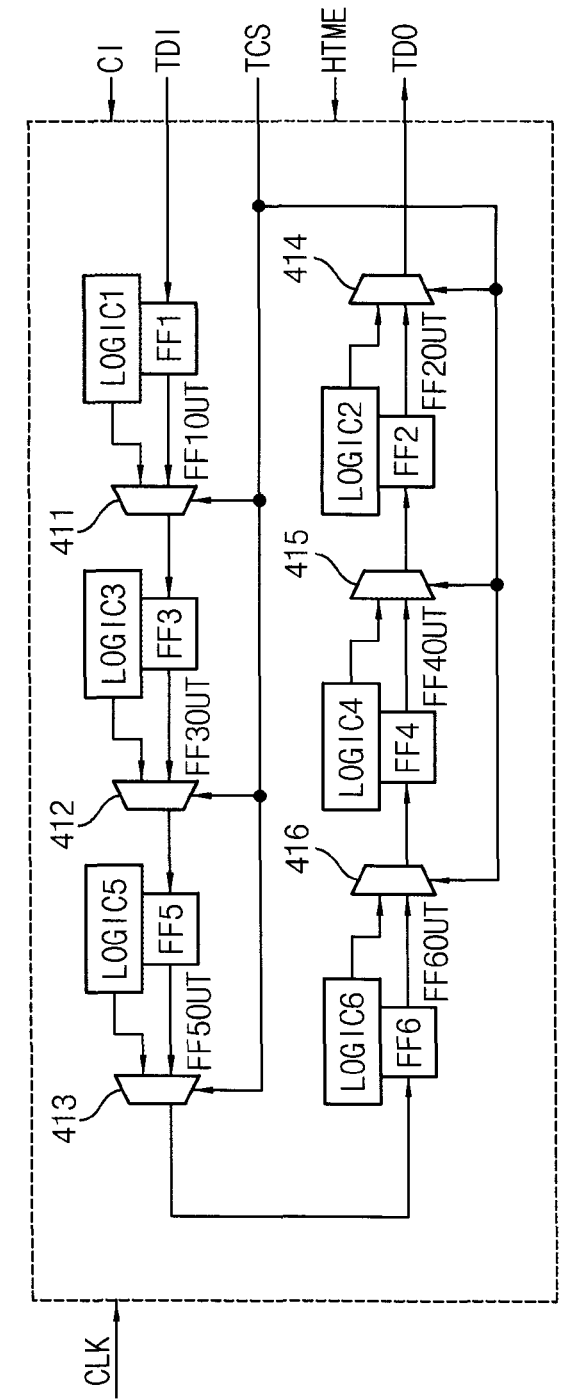
FIG. 6 is a block diagram illustrating a copied functional circuit which copies a function of the functional circuit included in the security circuit of FIG. 1.

FIG. 6 is a block diagram illustrating a copied functional circuit which copies a function of the functional circuit included in the security circuit of FIG. 1.

Referring to FIG. 6, an executing function of a copied functional circuit 400 is the same as an executing function of the functional circuit 200. A layout of combinational logic circuits LOGIC1, LOGIC2, LOGIC3, LOGIC4, LOGIC5, and LOGIC6 and flip-flops FF1, FF2, FF3, FF4, FF5, and FF6 included in the copied functional circuit 400 is different from a layout of the combinational logic circuits LOGIC1, LOGIC2, LOGIC3, LOGIC4, LOGIC5, and LOGIC6 and the flip-flops FF1, FF2, FF3, FF4, FF5, and FF6 included in the functional circuit 200 of FIG. 4.

The third combinational logic circuit LOGIC3 and the third flip-flop FF3 of the copied functional circuit 400 exist at a location where the second combinational logic circuit LOGIC2 and the second flip-flop FF2 exist on the functional circuit 200. The fifth combinational logic circuit LOGIC5 and the fifth flip-flop FF5 of the copied functional circuit 400 exist at a location where the third combinational logic circuit LOGIC3 and the third flip-flop FF3 exist on the functional circuit 200. The second combinational logic circuit LOGIC2 and the second flip-flop FF2 of the copied functional circuit 400 exist at a location where the fourth combinational logic circuit LOGIC4 and the fourth flip-flop FF4 exist on the functional circuit 200. The fourth combinational logic circuit LOGIC4 and the fourth flip-flop FF4 of the copied functional circuit 400 exist at a location where the fifth combinational logic circuit LOGIC5 and the fifth flip-flop FF5 exist on the functional circuit 200.

A possibility that the layout of the functional circuit 200 is the same as the layout of the copied functional circuit 400, and an order of the flip-flops of the test chain included in the functional circuit 200 is the same as an order of the flip-flops of the test chain included in the copied functional circuit 400 is extremely low.

When the hardware test mode signal HTME has the enabled level and the test control signal TCS has the enabled level, a first multiplexer 411 outputs the stored value FF1OUT of the first flip-flop FF1, and the output signal of the first multiplexer 411 is stored to the third flip-flop FF3 at the next rising edge of a clock signal CLK. A second multiplexer 412 outputs the stored value FF3OUT of the third flip-flop FF3, and the output signal of the second multiplexer 412 is stored to the fifth flip-flop FF5 at the next rising edge of the clock signal CLK. A third multiplexer 413 outputs the stored value FF5OUT of the fifth flip-flop FF5, and the output signal of the third multiplexer 413 is stored to the sixth flip-flop FF6 at the next rising edge of the clock signal CLK. A sixth multiplexer 416 outputs the stored value FF6OUT of the sixth flip-flop FF6, and the output signal of the sixth multiplexer 416 is stored to the fourth flip-flop FF4 at the next rising edge of the clock signal CLK. A fifth multiplexer 415 outputs the stored value FF4OUT of the fourth flip-flop FF4, and the output signal of the fifth multiplexer 415 is stored to the second flip-flop FF2 at the next rising edge of the clock signal CLK. A fourth multiplexer 414 outputs the stored value FF2OUT of the second flip-flop FF2 as the test data output signal TDO.

When the hardware test mode signal HTME has the enabled level and the test control signal TCS has the disabled level, the first multiplexer 411 outputs an output signal of the first combinational logic circuit LOGIC1, and the output signal of the first multiplexer 411 is stored to the third flip-flop FF3 at the next rising edge of the clock signal CLK. The second multiplexer 412 outputs an output signal of the third combinational logic circuit LOGIC3, and the output signal of the second multiplexer 412 is stored to the fifth flip-flop FF5 at the next rising edge of the clock signal CLK. The third multiplexer 413 outputs an output signal of the fifth combinational logic circuit LOGIC5, and the output signal of the third multiplexer 413 is stored to the sixth flip-flop FF6 at the next rising edge of the clock signal CLK. The sixth multiplexer 416 outputs an output signal of the sixth combinational logic circuit LOGIC6, and the output signal of the sixth multiplexer 416 is stored to the fourth flip-flop FF4 at the next rising edge of the clock signal CLK. The fifth multiplexer 415 outputs an output signal of the fourth combinational logic circuit LOGIC4, and the output signal of the fifth multiplexer 415 is stored to the second flip-flop FF2 at the next rising edge of the clock signal CLK. The fourth multiplexer 414 outputs an output signal of the second combinational logic circuit LOGIC2 as the test data output signal TDO.

Figure 7:
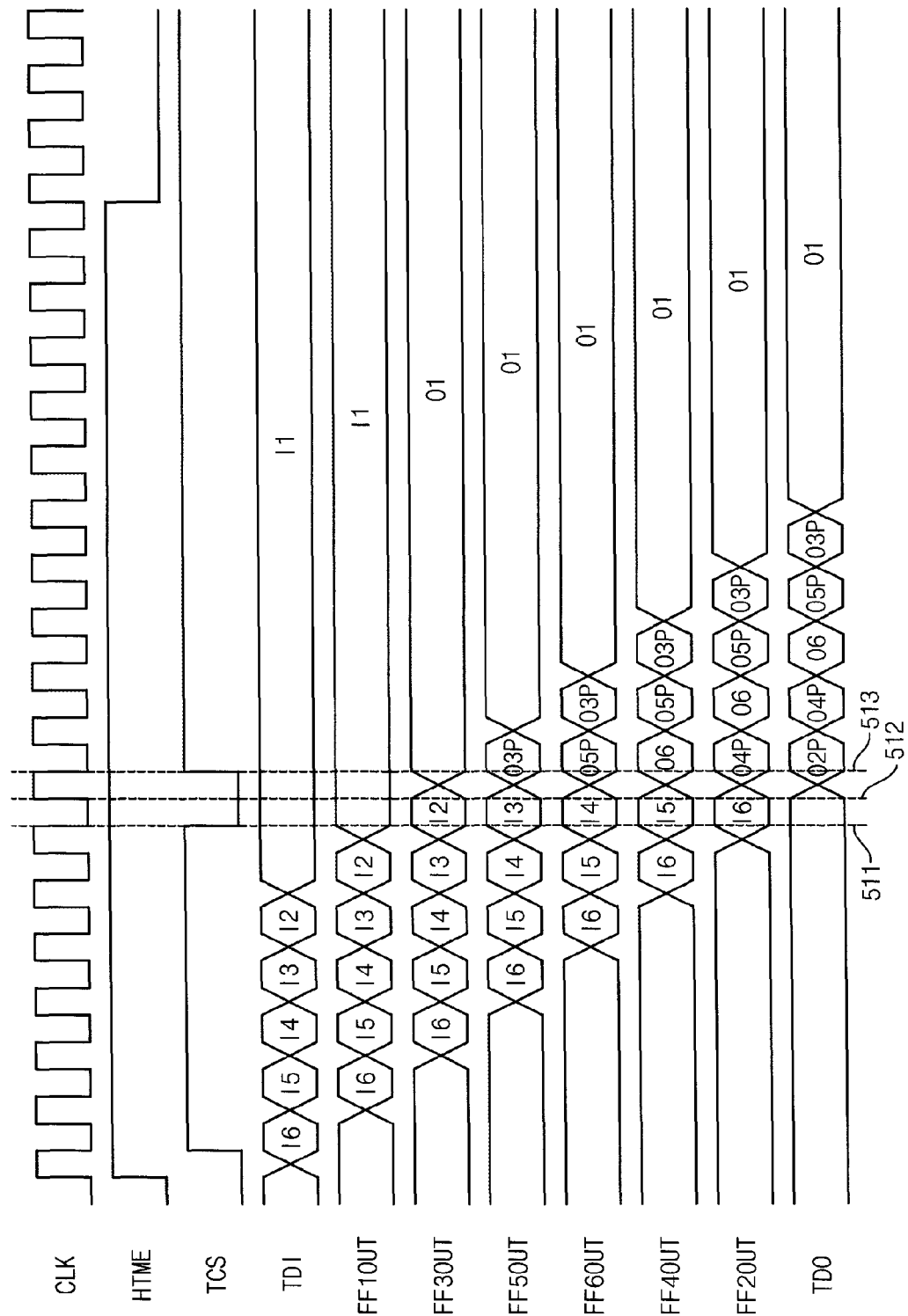
FIG. 7 is a timing diagram illustrating signals of the copied functional circuit of FIG. 6.

FIG. 7 is a timing diagram illustrating signals of the copied functional circuit of FIG. 6.

Referring to FIG. 7, signals before a first time point 511 may be understood with the reference to FIG. 5.

At the first time point 511, the first flip-flop FF1 stores the first input data I1, the third flip-flop FF3 stores the second input data I2, the fifth flip-flop FF5 stores the third input data I3, the sixth flip-flop FF6 stores the fourth input data I4, the fourth flip-flop FF4 stores the fifth input data I5, and the second flip-flop FF2 stores the sixth input data I6.

The test control signal TCS remains at the disabled level from the first time point 511 to a third time point 513. From the first time point 511 to the third time point 513, each of the flip-flops FF1, FF2, FF3, FF4, FF5, and FF6 stores output of each of the previous step combinational logic circuits LOGIC1, LOGIC2, LOGIC3, LOGIC4, LOGIC5, and LOGIC6 at every rising edge of the clock signal CLK.

At a second time point 512, the first combinational logic circuit LOGIC1 generates a first output data O1 based on the first input data I1 stored in the first flip-flop FF1. The third flip-flop FF3 stores the first output data O1 from the second time point 512 to the third time point 513. At a second time point 512, the third combinational logic circuit LOGIC3 generates a modified third output data O3P based on the second input data I2 stored in the third flip-flop FF3. The fifth flip-flop FF5 stores the modified third output data O3P from the second time point 512 to the third time point 513. At the second time point 512, the fifth combinational logic circuit LOGIC5 generates a modified fifth output data O5P based on the third input data I3 stored in the fifth flip-flop FF5. The sixth flip-flop FF6 stores the modified fifth output data O5P from the second time point 512 to the third time point 513. At the second time point 512, the sixth combinational logic circuit LOGIC6 generates a sixth output data O6 based on the fourth input data I4 stored in the sixth flip-flop FF6. The fourth flip-flop FF4 stores the sixth output data O6 from the second time point 512 to the third time point 513. At the second time point 512, the fourth combinational logic circuit LOGIC4 generates a modified fourth output data O4P based on the fifth input data I5 stored in the fourth flip-flop FF4. The second flip-flop FF2 stores the modified fourth output data O4P from the second time point 512 to the third time point 513. At the second time point 512, the second combinational logic circuit LOGIC2 generates a modified second output data O2P based on the sixth input data I6 stored in the second flip-flop FF2. The modified second output data O2P is outputted as the test data output signal TDO.

The test control signal TCS remains at the enabled level after the third time point 513. After the third time point 513, the test chain of FIG. 6 operates as a shifter which shifts stored value at every rising edge of the clock signal CLK. The modified second output data O2P, the modified fourth output data O4P, the sixth output data O6, the modified fifth output data O5P, the modified third output data O3P, and the first output data O1 are sequentially outputted as the test data output signal TDO.

The functional circuit 200 of FIG. 4 outputs the fourth output data O4, the fifth output data O5, the sixth output data O6, the third output data O3, the second output data O2, and the first output data O1 as the test data output signal TDO sequentially when the sixth input data I6, the fifth input data I5, the fourth input data I4, the third input data I3, the second input data I2, and the first input data I1 are sequentially inputted to the functional circuit 200 of FIG. 4. The copied functional circuit 400 of FIG. 6 outputs the modified second output data O2P, the modified fourth output data O4P, the sixth output data O6, the modified fifth output data O5, the modified third output data O3P, and the first output data O1 as the test data output signal TDO sequentially when the sixth input data I6, the fifth input data I5, the fourth input data I4, the third input data I3, the second input data I2, and the first input data I1 are sequentially inputted to the copied functional circuit 400 of FIG. 6. The functional circuit 200 of FIG. 4 and the copied functional circuit 400 of FIG. 6 execute the same function. The functional circuit 200 of FIG. 4 and the copied functional circuit 400 of FIG. 6 generate different test data output signals when the same test data input signal TDI is inputted.

The data storage unit DS included in the hardware test controller 120a of FIG. 2A may store the test data output signal TDO as the expected test data output signal TDO when the test data input signal TDI is inputted to the functional circuit 200 of FIG. 4.

The comparator CMP included in the hardware test controller 120a of FIG. 2A may execute the authentication procedure to the copied functional circuit 400 of FIG. 6 by comparing the expected test data output signal ETDO and the test data output signal TDO of the copied functional circuit 400 of FIG. 6. Because the expected test data output signal ETDO is different from the test data output signal TDO of the copied functional circuit 400, the hardware test controller 120a of FIG. 2A generates the authentication result AR representing a failure of authentication, and confirms that the copied functional circuit 400 is not a genuine circuit.

Figure 8:
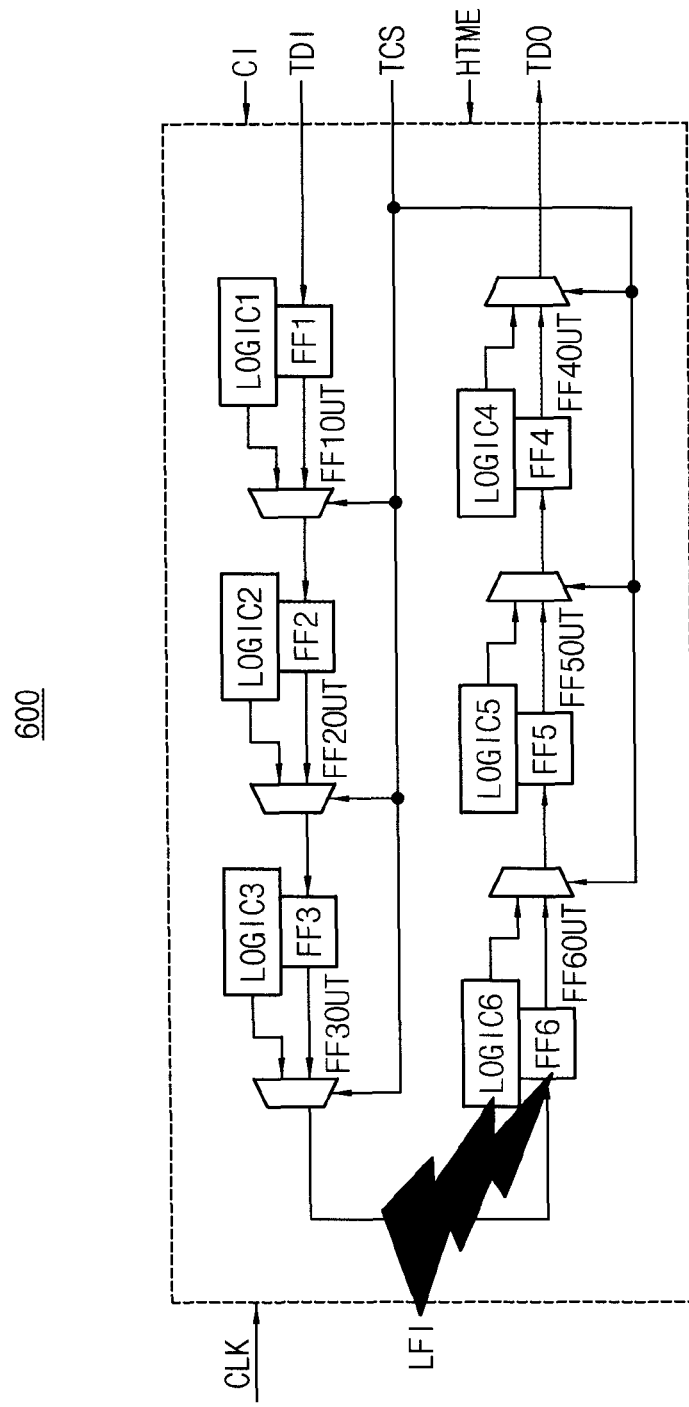
FIG. 8 is a block diagram illustrating the case that the functional circuit included in the security circuit of FIG. 1 is attacked physically.

FIG. 8 is a block diagram illustrating the case that the functional circuit included in the security circuit of FIG. 1 is attacked physically.

Referring to FIG. 8, a structure of a physically attacked functional circuit 600 is the same as a structure of the functional circuit 200 of FIG. 4. A test data input signal TDI inputted to the physically attacked functional circuit 600 is the same as the test data input signal TDI inputted to the functional circuit 200 of FIG. 4.

The security circuit 100 may be attacked by changing a portion of the stored values of flip-flops FF1, FF2, FF3, FF4, FF5, FF6 with the LFI method or the FIB method before combinational logic circuits LOGIC1, LOGIC2, LOGIC3, LOGIC4, LOGIC5, LOGIC6 execute operations based on the stored values of the flip-flops FF1, FF2, FF3, FF4, FF5, FF6. The LFI method or the FIB method may change the stored values of the flip-flops FF1, FF2, FF3, FF4, FF5, and FF6 from the enabled level to the disabled level. The LFI method or the FIB method may change the stored values of the flip-flops FF1, FF2, FF3, FF4, FF5, and FF6 from the disabled level to the enabled level.

FIG. 8 illustrates the case that the physically attacked functional circuit 600 is attacked by changing the stored value of a sixth flip-flop FF6 with the LFI method before a sixth combinational logic circuit LOGIC6 executes operation based on the stored value of the sixth flip-flop FF6.

Figure 9:
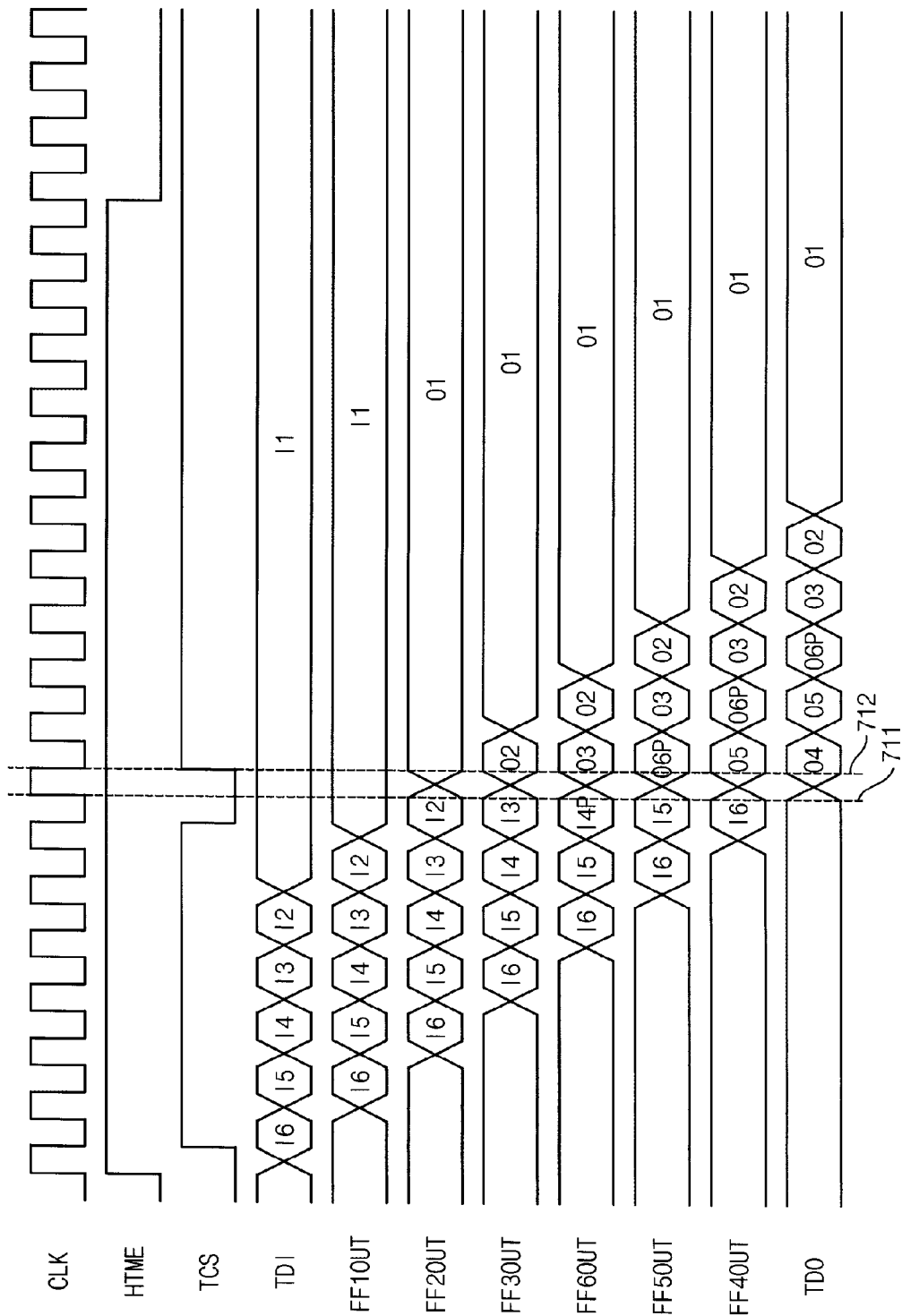
FIG. 9 is a timing diagram illustrating signals of the attacked functional circuit of FIG. 8.

FIG. 9 is a timing diagram illustrating signals of the physically attacked functional circuit of FIG. 8.

Referring to FIG. 9, operation of the signals before a first time point 711 may be understood based on the timing diagram of FIG. 5.

At the first time point 711, the first combinational logic circuit LOGIC1 generates a first output data O1 based on a first input data I1 stored in the first flip-flop FF1. The second flip-flop FF2 stores the first output data O1 from the first time point 711 to a second time point 712. At the first time point 711, the second combinational logic circuit LOGIC2 generates a second output data O2 based on a second input data I2 stored in the second flip-flop FF2. The third flip-flop FF3 stores the second output data O2 from the first time point 711 to the second time point 712. At the first time point 711, the third combinational logic circuit LOGIC3 generates a third output data O3 based on a third input data I3 stored in the third flip-flop FF3. The sixth flip-flop FF6 stores the third output data O3 from the first time point 711 to the second time point 712. At the first time point 711, the sixth combinational logic circuit LOGIC6 generates a modified sixth output data O6P based on a modified fourth input data I4P which is modified by the LFI method. The fifth flip-flop FF5 stores the modified sixth output data O6P from the first time point 711 to the second time point 712. At the first time point 711, the fifth combinational logic circuit LOGIC5 generates a fifth output data O5 based on a fifth input data I5 stored in the fifth flip-flop FF5. The fourth flip-flop FF4 stores the fifth output data O5 from the first time point 711 to the second time point 712. The fourth combinational logic circuit LOGIC4 generates a fourth output data O4 based on a sixth input data I6 stored in the fourth flip-flop FF4. The fourth output data O4 is outputted as the test data output signal TDO.

The test control signal TCS remains at the enabled level after the second time point 712. After the second time point 712 the test chain of FIG. 8 operates as a shifter which shifts stored value at every rising edge of the clock signal CLK.

After the second time point 712, the fourth output data O4, the fifth output data O5, the modified sixth output data O6P, the third output data O3, the second output data O2, and the first output data O1 are sequentially outputted as the test data output signal TDO.

The comparator CMP included in the hardware test controller 120a of FIG. 2A may execute the authentication procedure to the physically attacked functional circuit 600 of FIG. 8 by comparing the expected test data output signal ETDO and the test data output signal TDO of the physically attacked functional circuit 600 of FIG. 8. Because the expected test data output signal ETDO is different from the test data output signal TDO of the physically attacked functional circuit 600, the hardware test controller 120a of FIG. 2A generates the authentication result AR representing a failure of authentication, and confirms that the physically attacked functional circuit 600 is not a genuine circuit.

Figure 10:
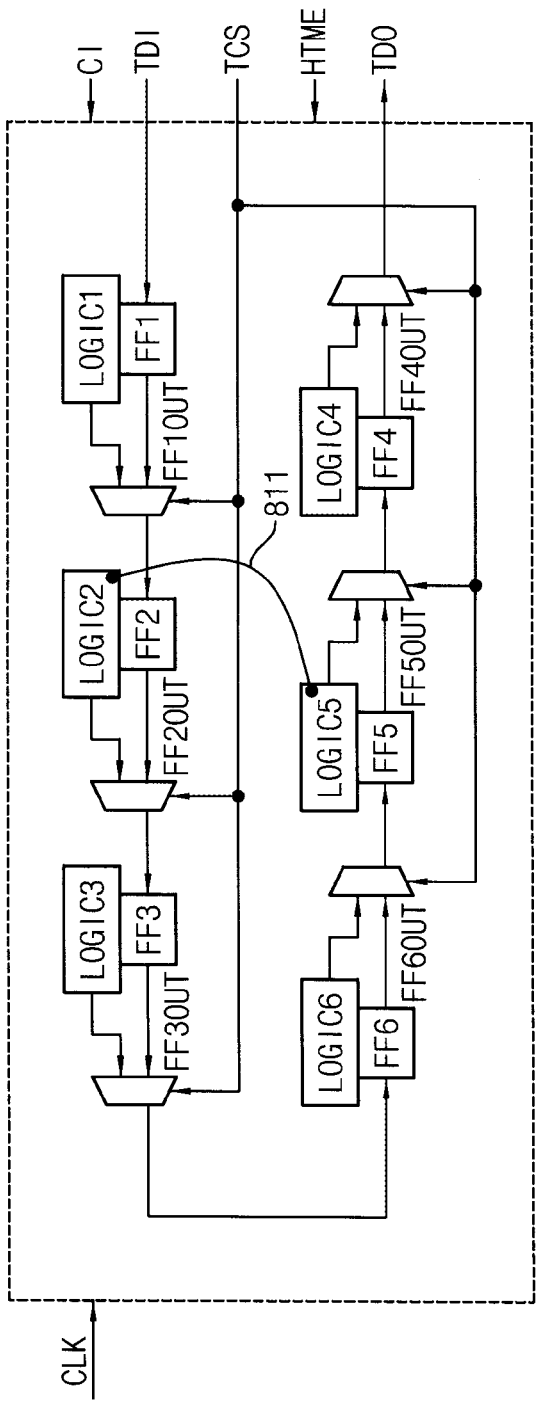
FIG. 10 is a block diagram illustrating the case that the functional circuit included in the security circuit of FIG. 1 is attacked physically.

FIG. 10 is a block diagram illustrating the case that the functional circuit included in the security circuit of FIG. 1 is attacked physically.

Referring to FIG. 10, a structure of a physically attacked functional circuit 800 is the same as a structure of the functional circuit 200 of FIG. 4 without a wire connecting a node of a second combinational logic circuit LOGIC2 and a node of a fifth combinational logic circuit LOGIC5. A test data input signal TDI inputted to the physically attacked functional circuit 800 is the same as the test data input signal TDI inputted to the functional circuit 200 of FIG. 4.

The security circuit 100 may be attacked by disconnecting a wire between a first node and a second node when combinational logic circuits LOGIC1, LOGIC2, LOGIC3, LOGIC4, LOGIC5, and LOGIC6 include the first node and the second node. The security circuit 100 may be attacked by connecting a third node and a fourth node which is originally not connected to the third node when the combinational logic circuits LOGIC1, LOGIC2, LOGIC3, LOGIC4, LOGIC5, and LOGIC6 include the third node and the fourth node.

FIG. 10 illustrates the case that the physically attacked functional circuit 800 is attacked by connecting with a wire 811 between a node included in the second combinational logic circuit LOGIC2 and a node which is included in the fifth combinational logic circuit LOGIC5, but which is not normally connected to the node included in the second combinational logic circuit LOGIC2.

Figure 11:
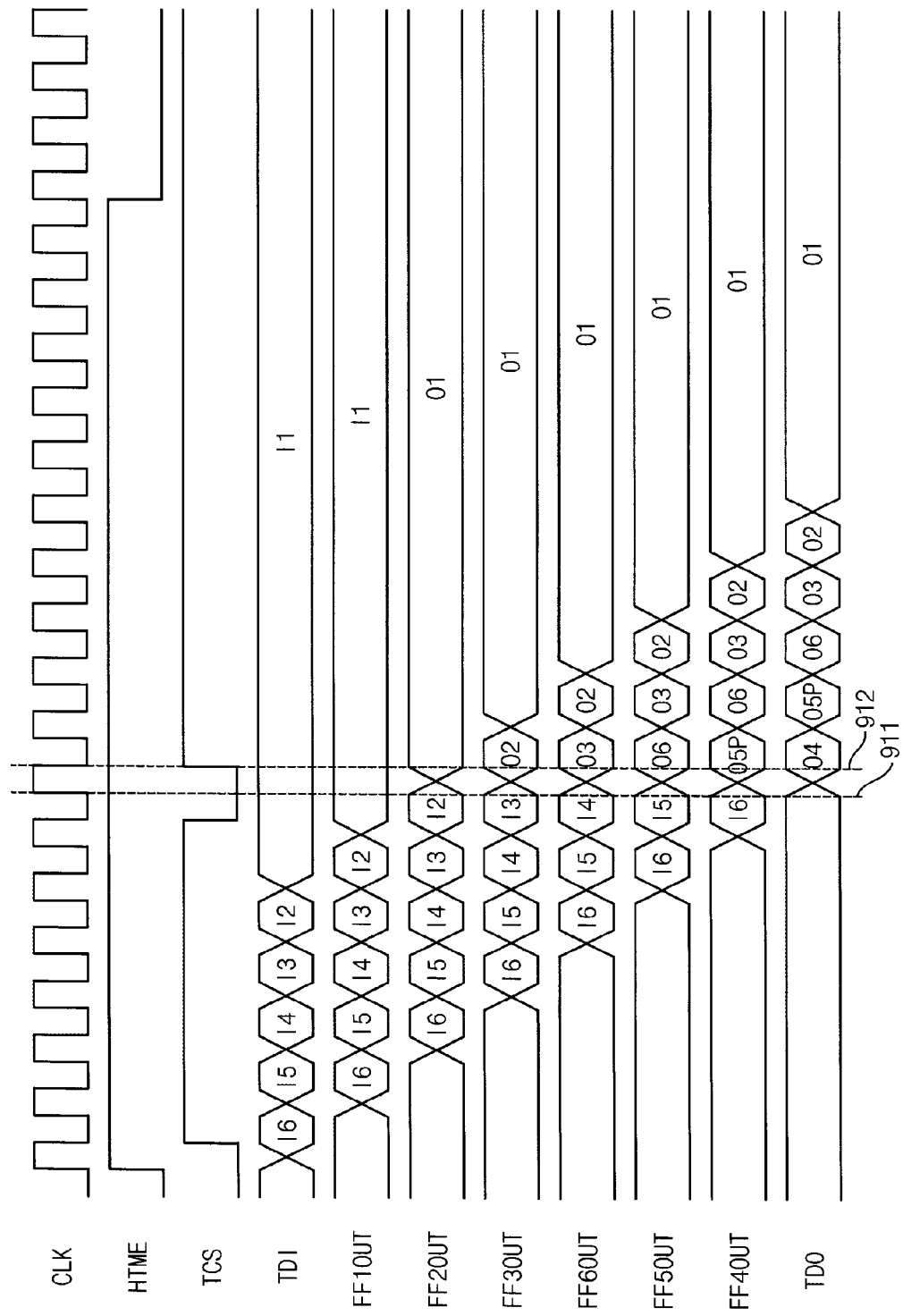
FIG. 11 is a timing diagram illustrating signals of the attacked functional circuit of FIG. 10.

FIG. 11 is a timing diagram illustrating signals of the attacked functional circuit of FIG. 10.

Referring to FIG. 11, operation of the signals before a first time point 911 may be understood based on the timing diagram of FIG. 5.

At the first time point 911, the first combinational logic circuit LOGIC1 generates a first output data O1 based on a first input data I1 stored in the first flip-flop FF1. The second flip-flop FF2 stores the first output data O1 from the first time point 911 to a second time point 912. At the first time point 911, the second combinational logic circuit LOGIC2 generates a second output data O2 based on a second input data I2 stored in the second flip-flop FF2. The third flip-flop FF3 stores the second output data O2 from the first time point 911 to the second time point 912. At the first time point 911, the third combinational logic circuit LOGIC3 generates a third output data O3 based on a third input data I3 stored in the third flip-flop FF3. The sixth flip-flop FF6 stores the third output data O3 from the first time point 911 to the second time point 912. At the first time point 911, the sixth combinational logic circuit LOGIC6 generates a sixth output data O6 based on a fourth input data I4 stored in the sixth flip-flop FF6. The fifth flip-flop FF5 stores the sixth output data O6 from the first time point 911 to the second time point 912. At the first time point 911, the fifth combinational logic circuit LOGIC5 modified with a wire 811 connected to a node included in the second combinational logic circuit LOGIC2 generates a modified fifth output data O5P based on a fifth input data I5 stored in the fifth flip-flop FF5. The fourth flip-flop FF4 stores the modified fifth output data O5P from the first time point 911 to the second time point 912. The fourth combinational logic circuit LOGIC4 generates a fourth output data O4 based on a sixth input data I6 stored in the fourth flip-flop FF4. The fourth output data O4 is outputted as the test data output signal TDO.

The test control signal TCS remains at the enabled level after the second time point 912. After the second time point 912 the test chain of FIG. 10 operates as a shifter which shifts stored value at every rising edge of the clock signal CLK.

After the second time point 912, the fourth output data O4, the modified fifth output data O5P, the sixth output data O6, the third output data O3, the second output data O2, and the first output data O1 are sequentially outputted as the test data output signal TDO.

The comparator CMP included in the hardware test controller 120a of FIG. 2A may execute the authentication procedure to the physically attacked functional circuit 800 of FIG. 10 by comparing the expected test data output signal ETDO and the test data output signal TDO of the physically attacked functional circuit 800 of FIG. 10. Because the expected test data output signal ETDO is different from the test data output signal TDO of the physically attacked functional circuit 800, the hardware test controller 120a of FIG. 2A generates the authentication result AR representing a failure of authentication, and confirms that the physically attacked functional circuit 800 is not a genuine circuit.

Figure 12:
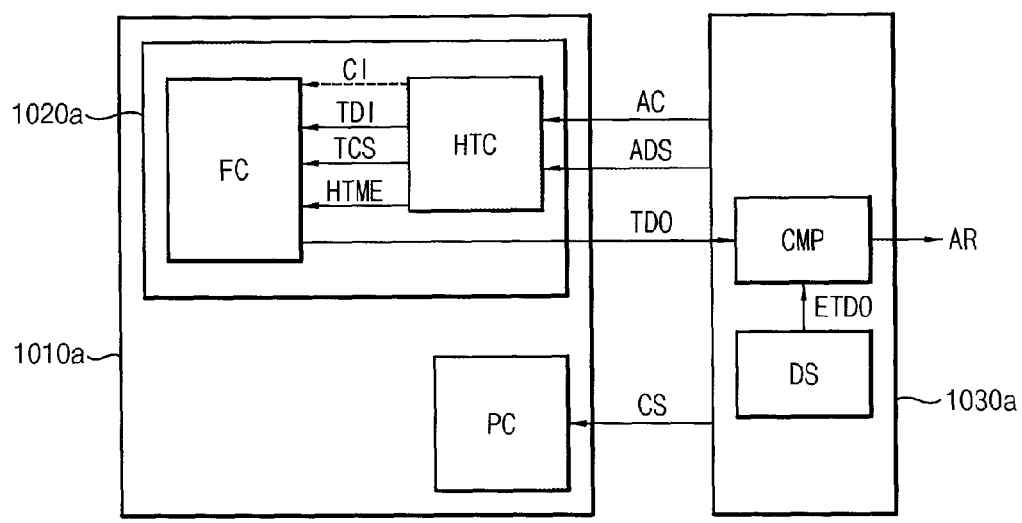
FIGS. 12 and 13 are block diagrams illustrating security systems according to some example embodiments.
Figure 13:
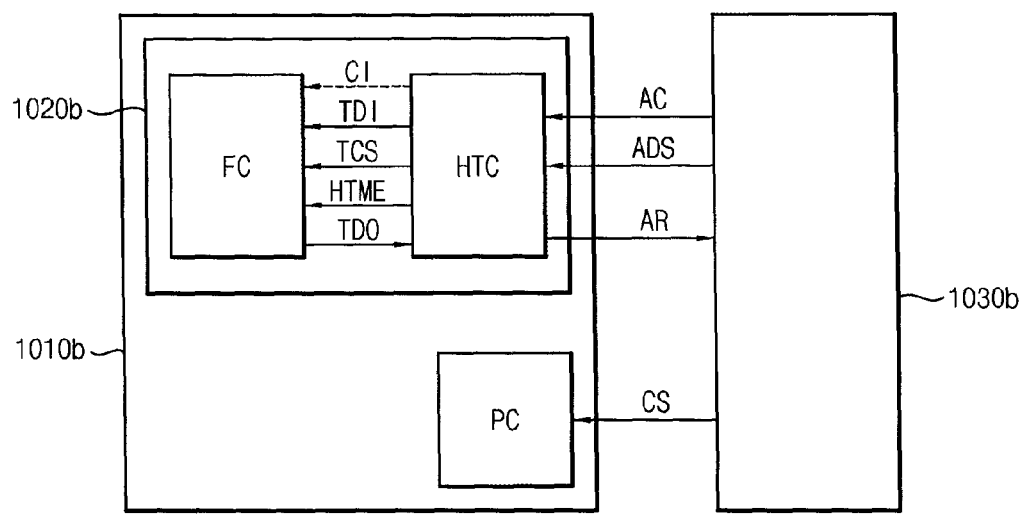

FIGS. 12 and 13 are block diagrams illustrating security systems according to example embodiments.

Referring to FIG. 12, a security system 1000a includes a controller 1030a and a security product 1010a having a security circuit 1020a. The security circuit 1020a includes a functional circuit FC and a hardware test controller HTC.

The functional circuit FC includes a test chain connecting a plurality of flip-flops to verify an executing function of a hardware of the functional circuit FC. The functional circuit FC generates a test data output signal TDO by encrypting a test data input signal TDI based on a test control signal TCS, a hardware test mode signal HTME, and the test chain. The hardware test controller HTC generates the test control signal TCS and the hardware test mode signal HTME based on an authentication command signal AC. The hardware test controller HTC generates the test data input signal TDI based on an authentication data signal ADS. The controller 1030a generates the authentication command signal AC and the authentication data signal ADS.

The security circuit 1020a including the hardware test controller HTC and the functional circuit FC may be understood based on the references to FIGS. 1 through 10.

The controller 1030a may include a data storage unit DS and a comparator CMP. The data storage unit DS may store an expected test data output signal ETDO corresponding to the test data input signal TDI. The comparator CMP generates an authentication result by comparing the test data output signal TDO and the expected test data output signal ETDO.

The comparator CMP and the data storage unit DS may be understood based on the references to FIGS. 2A and 2B.

The controller 1030a may disable the security product 1010a when the authentication result represents a failure of authentication. The controller 1030a may disable the security circuit 1020a or operate the security circuit 1020a in a protection mode when the authentication result represents a failure of authentication.

The controller 1030a generates a security product control signal CS based on the authentication result. A security product controller PC included in the security product 1010a may disable the security product 1010a or the security circuit 1020a based on the security product control signal CS. The security product controller PC may operate the security product 1010a or the security circuit 1020a in a protection mode.

A case that the authentication result represents a failure of authentication because the security circuit 1020a is copied was described with the references to FIGS. 6 and 7. Another case that authentication result represents a failure of authentication because the security circuit 1020a is physically attacked was described with references to FIGS. 8 through 11.

In an example embodiment, the security product 1010a may be a printer drum and the security circuit 1020a may be a security circuit included in a printer drum. The controller 1030a may disable the printer drum by stopping a function of the printer drum (e.g., a function of jetting ink). The controller 1030a may disable the security circuit included in the printer drum by delivering power to the security circuit included in the printer drum. The printer drum may be disabled if the security circuit included in the printer drum is disabled.

The security product 1010a and the security circuit 1020a selectively operate in a normal mode or the protection mode. When the security product 1010a is the printer drum and the security circuit 1020a is the security circuit included in the printer drum and the authentication procedure is failed, the printer drum in the protection mode may alarm instead of jetting ink. When the authentication procedure is failed, only a portion of the security circuit included in the printer drum may be turned on so as not to leak security information.

Referring to FIG. 13, a security system 1000b includes a controller 1030b and a security product 1010b having a security circuit 1020b. The security circuit 1020b includes a functional circuit FC and a hardware test controller HTC.

The functional circuit FC includes a test chain connecting a plurality of flip-flops to verify an executing function of a hardware of the functional circuit FC. The functional circuit FC generates a test data output signal TDO by encrypting a test data input signal TDI based on a test control signal TCS, a hardware test mode signal HTME, and the test chain. The hardware test controller HTC generates the test control signal TCS and the hardware test mode signal HTME based on the authentication command signal AC. The hardware test controller HTC generates the test data input signal TDI based on the authentication data signal ADS. The hardware test controller HTC generates the authentication result AR based on the test data output signal TDO.

The hardware test controller HTC may include a signal generator, a data storage unit, and a comparator. The signal generator may generate the test control signal TCS and the hardware test mode signal HTME based on the authentication command signal AC and generate the test data input signal TDI based on the authentication data signal ADS. The data storage unit may store an expected test data output signal ETDO corresponding to the test data input signal TDI. The comparator may generate an authentication result AR by comparing the test data output signal TDO and the expected test data output signal ETDO. The controller 1030b may generate the authentication command signal AC and the authentication data signal ADS.

The signal generator, the data storage unit, and the comparator included in the hardware test controller HTC are the same as the signal generator SG, the data storage unit DS and the comparator CMP included in FIGS. 2A and 2B. The controller 1030b may disable the security product 1010b or the security circuit 1020b or operate the security circuit 1020b in a protection mode when the authentication result represent a failure of authentication.

Figure 14:
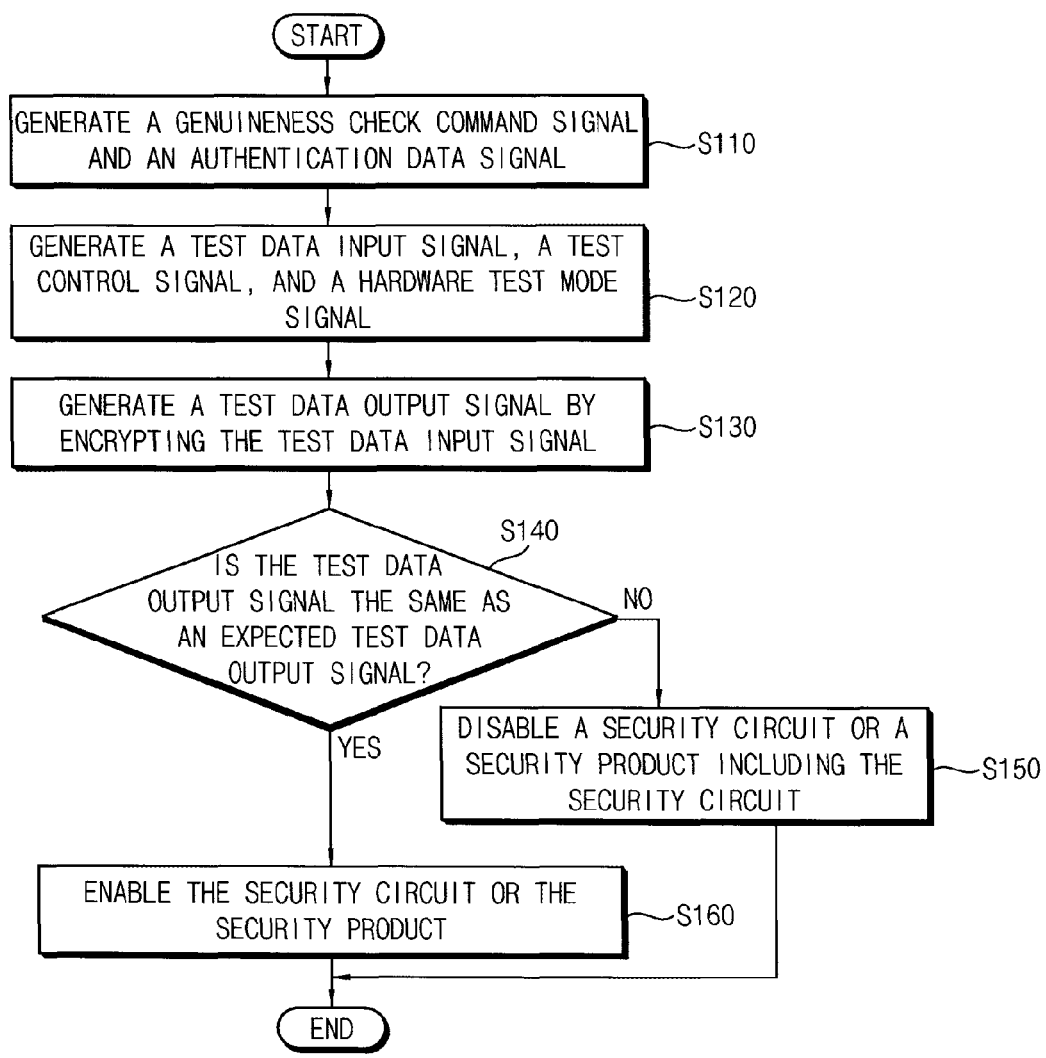
FIGS. 14 and 15 are flow charts illustrating authentication procedures of the security systems of FIGS. 12 and 13.
Figure 15:
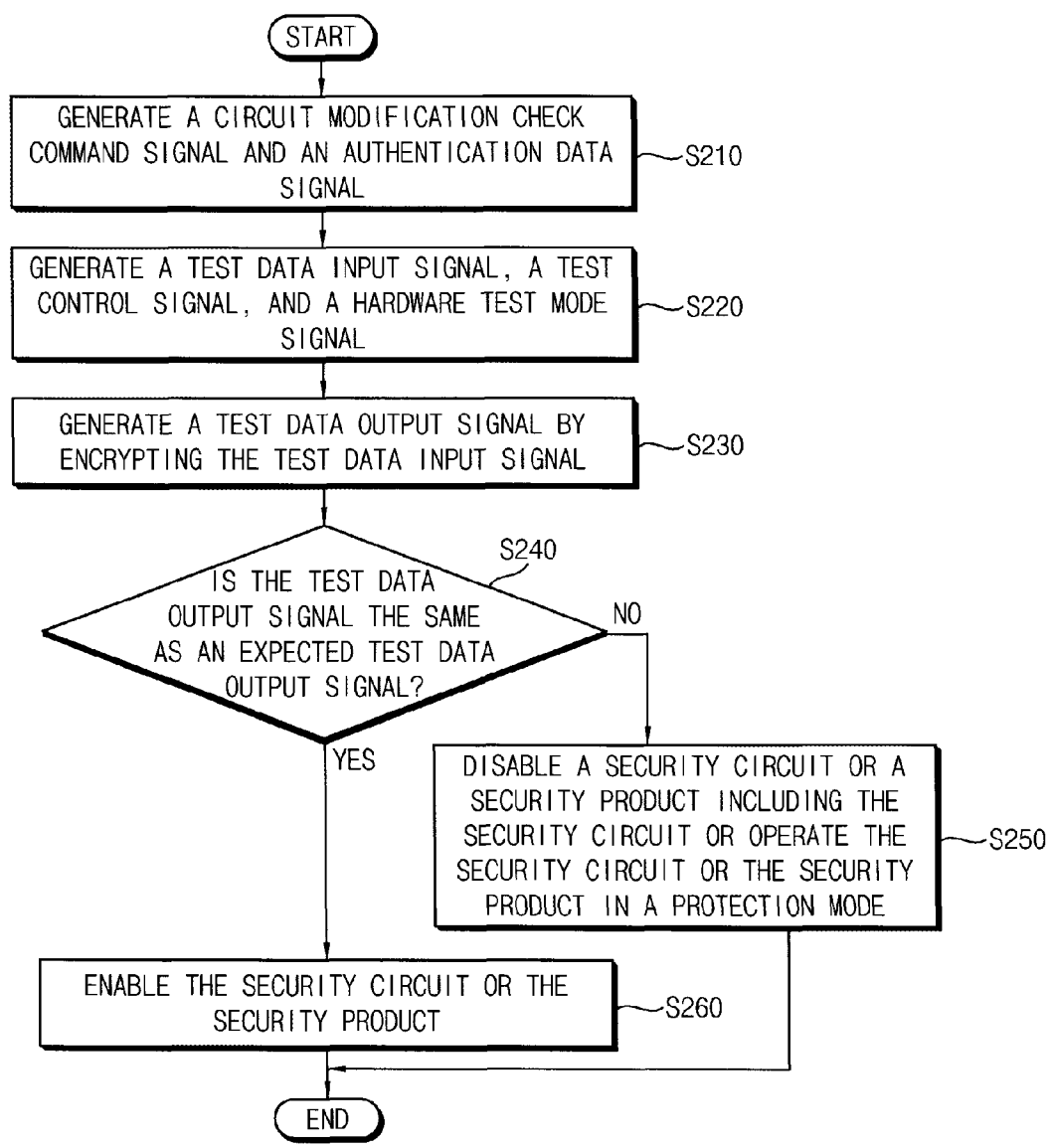

FIGS. 14 and 15 are flow charts illustrating authentication procedures of the security systems of FIGS. 12 and 13.

Referring to FIGS. 12 and 14, a genuineness check command signal and an authentication data signal is generated (S110). The controller 1030*a* included in the security system 1000*a* of FIG. 12 may generate the genuineness check command signal to check whether the security product 1010*a* is a genuine product or not. The genuineness check command signal is a sort of the authentication command signal AC.

A test data input signal, a test control signal, and a hardware test mode signal are generated based on the genuineness check command signal and the authentication data signal (S120). The hardware test controller HTC included in the security system 1000*a* of FIG. 12 may generate the test data input signal TDI, the test control signal TCS, and the hardware test mode signal HTME based on the genuineness check command signal and the authentication data signal ADS. The functional circuit FC included in the security system 1000*a* of FIG. 12 may enter the hardware test mode in response to the test control signal TCS and the hardware test mode signal HTME. A test data output signal is generated by encrypting the test data input signal (S130). In other word, the functional circuit FC included in the security system 1000*a* of FIG. 12 may generate the test data output signal TDO by encrypting the test data input signal TDI.

If the test data output signal is the same as an expected test data output signal (S140: YES), a security circuit or a security product including the security circuit is enabled (S160). If the test data output signal is different from the expected test data output signal (S140: NO), the security circuit or the security product is disabled (S150).

Generating the test data output signal (S130), determining whether the test data output signal is the same as the expected test data output signal (S140), disabling the security circuit or the security product (S150), and enabling the security circuit or the security product (S160) may be understood based on the references to FIGS. 4 through 11.

Referring to FIGS. 12 and 15, a circuit modification check command signal and an authentication data signal is generated (S210). The controller 1030*a* included in the security system 1000*a* of FIG. 12 may generate the circuit modification check command signal to check whether the security product 1010*a* is modified or not. The circuit modification check command signal is a sort of the authentication command signal AC.

A test data input signal, a test control signal, and a hardware test mode signal are generated based on the circuit modification check command signal and the authentication data signal (S220). The hardware test controller HTC included in the security system 1000*a* of FIG. 12 may generate the test data input signal TDI, the test control signal TCS, and the hardware test mode signal HTME based on the circuit modification check command signal and the authentication data signal ADS. A test data output signal is generated by encrypting the test data input signal (S230). In other word, the functional circuit FC included in the security system 1000*a* of FIG. 12 may generate the test data output signal TDO by encrypting the test data input signal TDI.

If the test data output signal is the same as an expected test data output signal (S240: YES), a security circuit or a security product including the security circuit is enabled (S260). If the test data output signal is different from the expected test data output signal (S240: NO), the security circuit or the security product is disabled or is operated in a protection mode (S250).

Generating the test data output signal (S230), determining whether the test data output signal is the same as the expected test data output signal (S240), disabling the security circuit or the security product (S250), and enabling the security circuit or the security product (S260) may be understood based on the references to FIGS. 4 through 11.

Figure 16:
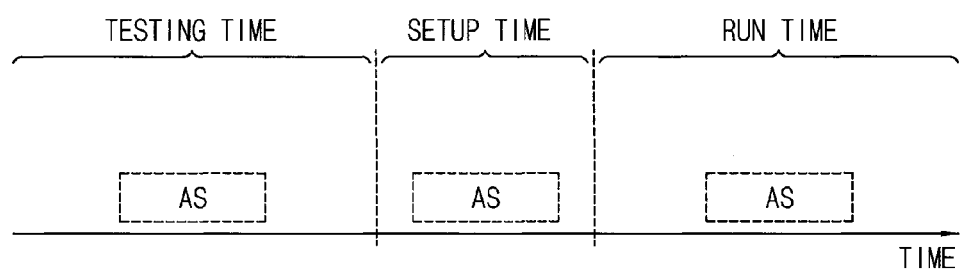
FIG. 16 is a timing diagram illustrating the executing time of the authentication procedures of FIGS. 14 and 15.

FIG. 16 is a timing diagram illustrating the executing time of the authentication procedures of FIGS. 14 and 15.

Referring to FIG. 16, the hardware test controllers HTC included in the security systems 1000*a*, 1000*b* of FIGS. 12 and 13 may enable the hardware test mode signal HTME during a setup time SETUP TIME of the functional circuits FC included in the security systems 1000*a*, 1000*b* of FIGS. 12 and 13 or a run time RUN TIME of the functional circuits FC.

Authentication procedures AS of FIGS. 14 and 15 (S110 through S160, S210 through S260) may be performed during a testing time TESTING TIME that functions of the security systems 1000*a*, 1000*b* are tested. During performing the authentication procedures AS the hardware test mode signal HTME may be enabled.

The authentication procedures AS may be performed during the setup time SETUP TIME of the security systems 1000*a*, 1000*b*. The authentication procedures AS may be performed during the run time RUN TIME of the security systems 1000*a*, 1000*b* after the setup time SETUP TIME of the security systems 1000*a*, 1000*b*.

The foregoing is illustrative of some example embodiments and is not to be construed as limiting thereof. Although some example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A security circuit, comprising:
   a functional circuit including a test chain that connects a plurality of flip-flops to check a circuit modification of the functional circuit according to a circuit modification check command, the functional circuit configured to generate a test data output signal based on a test control signal, a hardware test mode signal, and the test chain; and
   a hardware test controller configured to generate the test data input signal, the test control signal, and the hardware test mode signal, and configured to generate an authentication result based on the test data output signal.

2. The security circuit of claim 1, wherein the hardware test controller comprises:
   a signal generator configured to generate the test data input signal based on an authentication data signal;
   a data storage unit configured to store an expected test data output signal corresponding to the test data input signal; and
   a comparator configured to generate the authentication result by comparing the test data output signal and the expected test data output signal.

3. The security circuit of claim 2, wherein the signal generator is further configured to generate the test control signal and the hardware test mode signal based on a test start signal, which is generated periodically by the signal generator, or an authentication command signal.

4. The security circuit of claim 2, wherein the data storage unit is further configured to store the authentication data signal, and
wherein the data storage unit is further configured to provide the authentication data signal to the signal generator.

5. The security circuit of claim 1, wherein the functional circuit further comprises:
a plurality of combinational logic circuits configured to perform an executing function based on stored values of the flip-flops and combinational logic circuit input signals.

6. The security circuit of claim 5, wherein the hardware test controller is further configured to generate the combinational logic circuit input signals based on an authentication data signal.

7. The security circuit of claim 6, wherein the functional circuit is further configured to generate the test data output signal by encrypting the test data input signal based on the combinational logic circuit input signals.

8. The security circuit of claim 1, wherein the hardware test controller is further configured to disable the security circuit or to operate the security circuit in a protection mode when the authentication result represents a failure of authentication.

9. The security circuit of claim 1, wherein the hardware test controller is further configured to enable the hardware test mode signal during a reset time or a run time of the functional circuit.

10. A security system, comprising:
a first controller configured to generate an authentication command signal and an authentication data signal; and
a security product including a security circuit which includes:
a functional circuit including a test chain that connects a plurality of flip-flops to check genuineness of the functional circuit according to a genuineness check command signal, the functional circuit configured to generate a test data output signal by encrypting a test data input signal based on a test control signal, a hardware test mode signal, and the test chain; and
a hardware test controller configured to generate the test control signal and the hardware test mode signal based on the authentication command signal, and configured to generate the test data input signal based on the authentication data signal.

11. The security system of claim 10, wherein the first controller comprises:
a data storage unit configured to store an expected test data output signal corresponding to the test data input signal; and
a comparator configured to generate an authentication result by comparing the test data output signal and the expected test data output signal.

12. The security system of claim 11, wherein the first controller is further configured to disable the security product when the authentication result represents a failure of authentication.

13. The security system of claim 11, wherein the first controller is further configured to disable the security circuit or to operate the security circuit in a protection mode when the authentication result represents a failure of authentication.

14. The security system of claim 10, wherein the hardware test controller comprises:
a signal generator configured to generate the test control signal and the hardware test mode signal based on the authentication command signal, and configured to generate the test data input signal based on the authentication data signal;
a data storage unit configured to store an expected test data output signal corresponding to the test data input signal; and
a comparator configured to generate an authentication result by comparing the test data output signal and the expected test data output signal.

15. The security system of claim 14, wherein the first controller is further configured to disable the security product when the authentication result provided from the hardware test controller represents a failure of authentication.

16. The security system of claim 14, wherein the first controller is further configured to disable the security circuit or to operate the security circuit in a protection mode when the authentication result represents a failure of authentication.

17. A security circuit, comprising:
a first device comprising a plurality of flip-flops in a test chain, the first device configured to receive first, second, and third signals, and configured to generate a fourth signal by encrypting the first signal based on the second signal, the third signal, and the test chain; and
a second device configured to generate the first, second, and third signals, and configured to generate an authentication result based on the fourth signal;
wherein the second device is configured to enable a hardware test mode signal during a setup time or a run time of the first device.

18. The security circuit of claim 17, wherein the second device is further configured to disable the security circuit when the authentication result represents a failure of authentication.

19. The security circuit of claim 17, wherein the second device is further configured to operate the security circuit in a protection mode when the authentication result represents a failure of authentication.

20. The security circuit of claim 17, wherein the second device is further configured to disable the security circuit or to operate the security circuit in a protection mode when the authentication result represents a failure of authentication.

* * * * *